Feb. 22, 1949.  J. P. WARREN  2,462,577
WIND PRESSURE GAUGE
Filed Oct. 22, 1945

J. P. WARREN
INVENTOR.

BY J. Vincent Martin
and
Ralph R. Browning
ATTORNEYS

Patented Feb. 22, 1949

2,462,577

UNITED STATES PATENT OFFICE 2,462,577

WIND-PRESSURE GAUGE

James P. Warren, Freeport, Tex.

Application October 22, 1945, Serial No. 623,713

5 Claims. (Cl. 73—189)

This invention relates in general to wind measuring and indicating devices and more particularly has reference to an apparatus for indicating and measuring the velocity or pressure of wind and the direction thereof.

Heretofore, two general types of wind-pressure instruments have been in use. One is the cup-type anemometer with its rotating members and bearings exposed to the elements. The delicacy of construction that this type of instrument requires reduces its reliability in order to obtain sensitiveness. In addition this type instrument has the disadvantage of bearing friction, exposure to rain, and the necessary correction factors.

Another type of wind gauge in general use is that of the pitot tube type. This instrument has a self-contained wind vane which is necessary as the wind vane directs the orifices into the wind. Moisture accumulation devices to trap moisture out of the tubes are essential. In addition there is a problem of bearing friction, and the unsteadiness of a rotating direction vane, all of which add to the necessary corrections or attention in order to maintain accuracy.

A study of the known instruments for measuring wind pressure and velocity shows the many problems involved, such as keeping moisture from affecting the accuracy of readings; bearings, cups, and moving parts exposed to the elements; corrections to be applied to rotating instruments; and considerable attention and maintenance to keep equipment of this nature in use and to measure wind velocities accurately.

The principal object of this invention is to provide an apparatus for indicating or measuring the pressure or velocity of wind and the direction thereof, which avoids the disadvantages of the prior art.

Another object of this invention is to provide an apparatus for indicating or measuring the pressure or velocity of wind and the direction thereof which has all parts subject to damage from the weather elements enclosed.

A further object of this invention is to provide an apparatus for indicating or measuring the pressure or velocity of wind and the direction thereof, which has fewer moving parts, fewer corrections, sturdier instrument, easier installation, no moving parts exposed to the elements, no rotating parts or linkage requiring corrections to obtain accurate readings, and no devices required for trapping moisture that may interfere with accuracy of readings.

Still another object of this invention is to provide an apparatus for indicating or measuring the pressure or velocity of wind and the direction thereof, which comprises a body subject to action of the wind mounted upon a flexible element and means for indicating or measuring the amount and direction of deflection of said body.

Other objects and advantages of the present invention will be more apparent from the following description.

In order to facilitate an understanding of the invention, reference is made to the accompanying drawings, in which.

Figure 1:
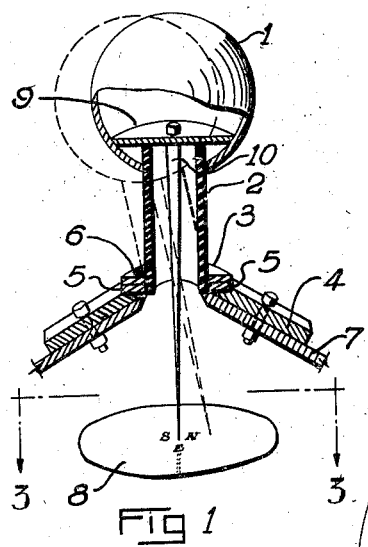
Figure 1 is a perspective view partly in vertical section of a wind pressure or velocity gauge constructed in accordance with the present invention.
Figure 3:
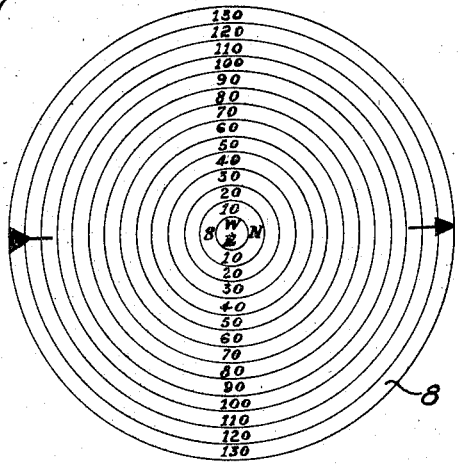
Figure 2:
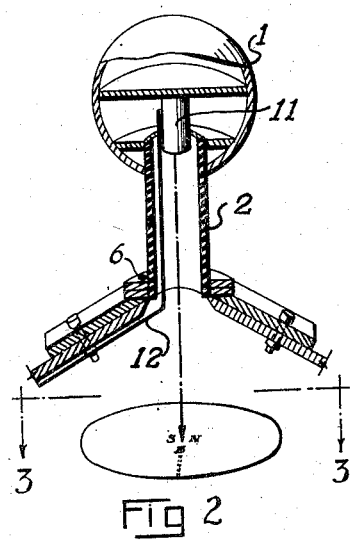
Fig. 2 is a similar view of a modified form of gauge also embodying the principles of the present invention.

Fig. 3 is an enlarged plan view of the chart for association with the gauges of Figs. 1 and 2 as seen when viewed in the direction of the arrows 3—3 of Figs. 1 and 2.

As clearly illustrated in Fig. 1 of the drawings, a wind gauge constructed in accordance with the present invention comprises a body 1 which is shown as a sphere. This spherical body is secured to the upper end of a flexible tube 2 which is vertically positioned as shown. Tube 2 carries a flange 3 just above its lower end which is attached to a mounting support 4 having a seat 5 to receive the flange 3 and a recess to receive the lower end of the tube 2. Securing means such as screws 6 may be provided for fastening the flange 3 to the seat 5.

Mounting support 4 may be bolted or otherwise secured to a roof 7 or upper part of a shelter for housing a chart 8. Support 4 may be constructed of any suitable material and should rigidly anchor the lower portion of tube 2. There can be many combinations of this base mounting for mounting the wind-pressure gauge on buildings, boats, automobiles, trains, airplanes, or any place desired.

As hereinbefore indicated, tube 2 is flexible. The flexing tube is constructed of an accurately bored member, calibrated in size and length to suit the conditions under which an instrument will perform. This tube is preferably made of metal or other material having the property of flexing from a given position under load and returning to its given position upon release of the load.

Sphere 1 contains a brace 9 to which the upper free end of the tube 2 is secured and which serves as a support for a pendulum or indicator 10. It will be noted that the pendulum extends from the brace 9 down through the tube 2 to a position over the chart 8 which is suitably supported directly beneath the base of tube 2 with its center concentric with the axis of the base of tube 2.

With the device constructed as above described, the lower end of the pointer 10 will lie directly over the center of the chart 8 when the sphere 1 is in its position of rest. When the wind acts upon the sphere 1 it will laterally displace the same causing tube 2 to flex or bend. The displacement of the sphere will depend upon the wind velocity, the diameter of the sphere and the resistance of the tube 2 to bending. Resistance of tube 2 to bending will depend upon the material of which the tube is constructed, its cross-sectional area and the length thereof. Upon cessation of the wind or reduction of its velocity the sphere will tend to return to its initial position.

Pointer 10 in cooperation with chart 8 serves to give an indication of the velocity of the wind. Chart 8 is a standard circular record which can be mounted in a convenient location on which to receive indications or graphic records. This chart can be graduated as desired, in miles per hour or pounds per square inch. In addition, this chart may carry printing indicating directions and both wind pressure and wind directions may be obtained simultaneously from the chart. Obviously the length of pointer 10 may vary, the ratio of the deflection of the lower end thereof to the displacement of the sphere being dependent upon the length thereof. Actually the pointer 10 in effect pivots about its intermediate portion in the vicinity of the lower end of tube 2.

In an actual installation the size of the sphere, the length and size of tube 2 and its material, the length of pointer 10 and the chart 8 are correlated to produce a determined deflection of the lower end of the pointer for a given wind velocity. Thus the velocity and direction of the wind may be observed upon inspecting chart 8.

Instead of pointer 10 the displacement of the sphere 1 may be indicated on the chart 8 by a light beam projected from a suitable lamp 11 carried by the brace 9 as illustrated in Fig. 2 of the drawings. Electric current from lamp 11 may be supplied through wires 12 as shown. A beam of light from lamp 11 will fall on chart 8 and thereby indicate on said chart the displacements of sphere 1.

Of course, any other means for transmission of deflections of sphere 1 to the chart may be employed.

From the foregoing description it will be appreciated that the present invention provides a simple and highly effective construction for wind measuring and indicating apparatus.

Having described my invention, I claim:

1. A wind velocity indicator comprising a flexible tubular member of resilient material, fixed at one end and having its other end free, a body carried by the free end of said tubular member for exposure to the wind, indicia carrying means beneath the fixed end of said tubular member and an indicating device carried solely by said body and communicating directly with the indicia carrying means through said tubular member.

2. A wind velocity indicator comprising a fixed support having an opening therethrough, a resilient flexible tube fixed at one end in the opening in said support and extending vertically therefrom, a wind displaceable body fixed to the free end of said tube, an indicia carrying chart positioned with its center in alignment with the fixed end of said tube, and indicating means carried solely by said body on the free end of said tube and directly cooperating with the chart for indicating deflections of said body.

3. A wind velocity indicator comprising a fixed support having an opening therethrough, a resilient flexible tube fixed at one end in the opening in said support and extending vertically therefrom, a wind displaceable body fixed to the free end of said tube, an indicia carrying chart positioned with its center in alignment with the fixed end of said tube, and optical indicating means carried by said body on the free end of said tube and cooperating with the chart for indicating deflections of said body.

4. A wind velocity indicator comprising a fixed support having an opening therethrough, a resilient flexible tube fixed at one end in the opening in said support and extending vertically therefrom, a wind displaceable body fixed to the free end of said tube, an indicia carrying chart positioned with its center in alignment with the fixed end of said tube, and a rod fixed to said body and extending down through said tube to said chart for cooperation therewith to indicate deflections of said body.

5. A wind velocity indicator comprising a fixed support having an opening therethrough, a resilient flexible tube fixed at one end in the opening in said support and extending vertically therefrom, a wind displaceable body fixed to the free end of said tube, an indicia carrying chart positioned with its center in alignment with the fixed end of said tube, and a source of light carried by said body and directed to project a beam of light down through the tube and opening in the support onto said chart to indicate deflections of said body.

JAMES P. WARREN.

REFERENCES CITED

The following references are of record in the file of this patent:

UNITED STATES PATENTS

| Number | Name | Date |
|---|---|---|
| 1,830,673 | Noren | Nov. 3, 1931 |
| 2,024,571 | Gent | Dec. 17, 1935 |
| 2,031,018 | Thomas | Feb. 18, 1936 |
| 2,098,099 | Kahn | Nov. 2, 1937 |
| 2,125,365 | Waller | Aug. 2, 1938 |
| 2,266,316 | Martin et al. | Dec. 16, 1941 |

FOREIGN PATENTS

| Number | Country | Date |
|---|---|---|
| 1,839 | Great Britain | 1865 |
| 195,794 | Germany | Feb. 25, 1908 |
| 354,000 | Great Britain | Aug. 6, 1931 |
| 415,400 | Germany | June 29, 1925 |